March 26, 1974    R. A. ZEINEH    3,799,863
ELECTROPHORESIS AND ELECTROFOCUSING APPARATUS
Original Filed April 26, 1971    5 Sheets-Sheet 1
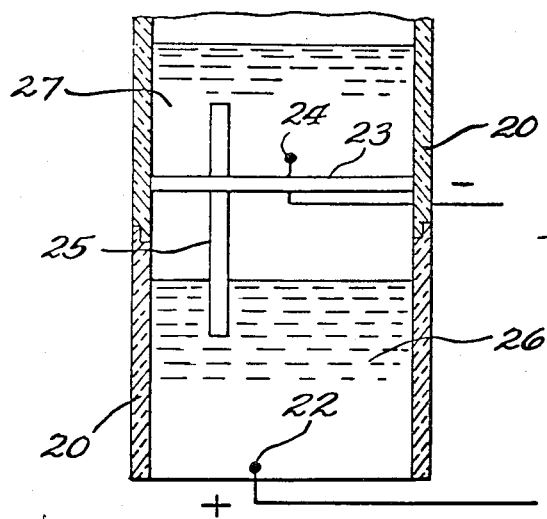
Fig.1.
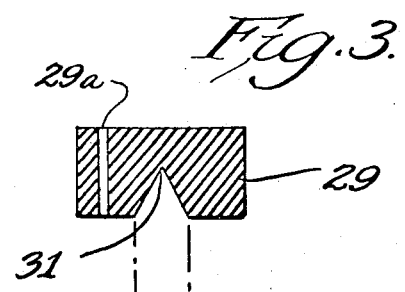
Fig.3.
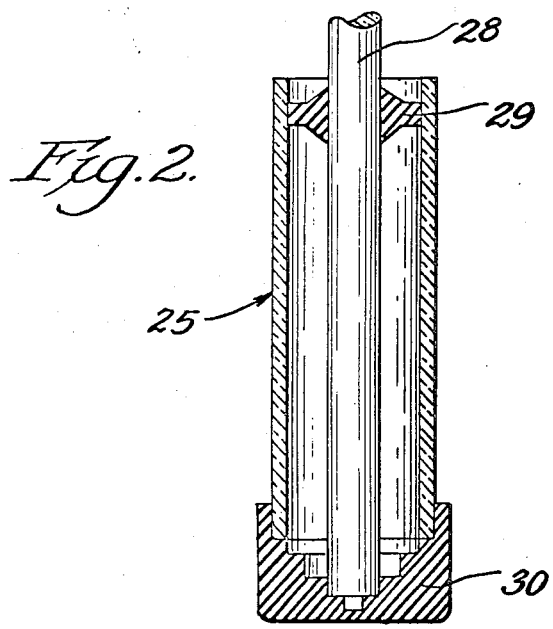
Fig.2.
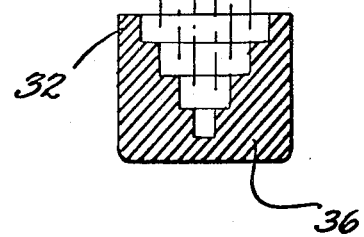

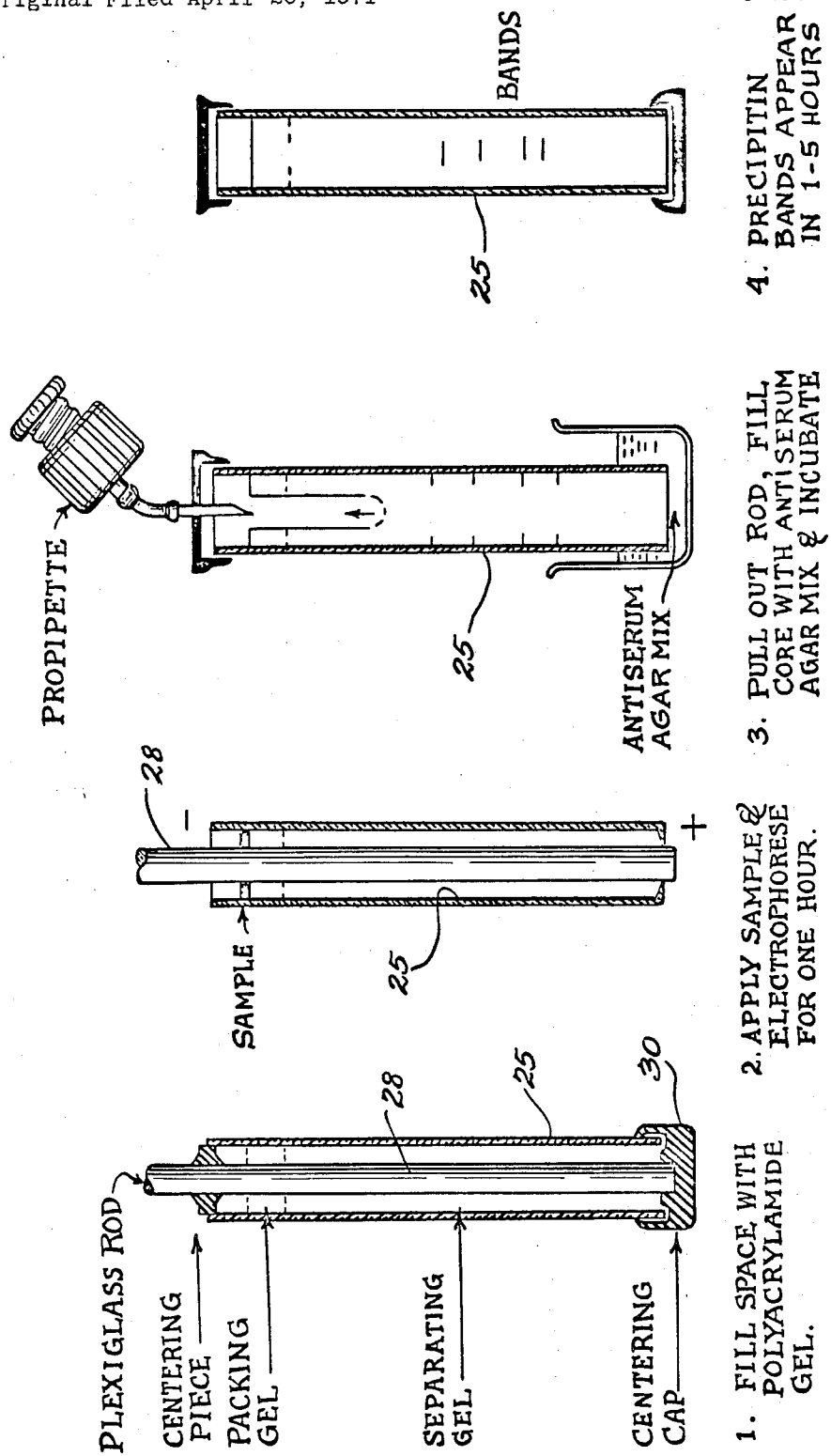

United States Patent Office 3,799,863
Patented Mar. 26, 1974

3,799,863
ELECTROPHORESIS AND ELECTROFOCUSING
APPARATUS
Rashid A. Zeineh, 5742 W. Dakin St.,
Chicago, Ill. 60634
Original application Apr. 26, 1971, Ser. No. 137,490, now
Patent No. 3,699,033. Divided and this application
Sept. 20, 1972, Ser. No. 290,432
Int. Cl. B01k 5/00
U.S. Cl. 204—299                7 Claims

ABSTRACT OF THE DISCLOSURE

A method and apparatus for electrophoretic and electrofusing analysis. Tubes with gel around an internal core rod or rods enable analysis of samples which are electrophoresed within the tube without removing the gel and sample from the tube.

---

This is a divisional application of my copending application Ser. No. 137,490, filed Apr. 26, 1971, now Pat. No. 3,699,033.

This method relates to a new and useful improvement in electrophoretic and/or electrofocusing separation and methods of detection and more particularly seeks to provide a method of detecting specific charged particles which may be separated from a mixture of charged particles.

U.S. Pat. 3,384,564 discloses a method of electrophoresis in which glass tubes are used. The electrophoretic tubing is capped at the lower end and is filled with polyacrylamide separating gel. After solidification another layer of about one-half inch thickness packing gel is added. After the packing gel has solidified the lower cap is removed and the tube is placed in an electrophoretic cell. The lower container and the upper container of the electrophoretic cell are half filled with a sodium barbital, glycine buffer of pH 8.3. The sample containing a mixture of charged particles or proteins is mixed with sucrose to prevent diffusion. The sample is then layered slowly over the top gel (packing gel). After turning on the electrophoretic current the sample with a height or thickness of about 0.5 centimeter is first concentrated to a thickness of about 10 microns. This step achieves a thin application system. Applying a sample in a very thin layer enhances the electrophoretic separation. The migration distances need not be too great in order to show distinct separation of the charged particles. In addition, when the sample goes into the separating gel, which has a sieving effect, it offers frictional resistance to the movement of these particles. Thus the difference in electrophoretic mobility is more pronounced, resulting in higher resolution and greater separation of the charged particles than in other electrophoretic methods. However, with this method, detection is complicated and extremely difficult, resulting in limited use of the technique, and identification of separated components is practically impossible.

For example, the gel must be removed from the tube in order to detect the separated components by staining. A dissecting needle is used in order to separate the gel from the walls on either side of the tube. Then a Pasteur pipette is stretched to form a narrow, long bore and a fine stream of water is applied to the sides of the tube between the gel and the glass wall to advance the separation of the gel from the glass tubing. This tedious and time consuming task is required to loosen the gel so that it may be removed from the tube. It is then placed in Amido Schwartz stain in a fixative solution of 7% acetic acid. The stain diffuses into the gel and stains the proteins that are fixed by the acetic acid. The stain also diffuses into the background. After an hour the gel is removed from the stain and is placed in a second tube with a larger internal diameter and a constricted lower end to prevent the gel from going through the tube. This tube is placed into the electrophoretic cell and electric current is again applied in order to remove the extra stain (destaining). The separated proteins appear as deep blue discs in the polyacrylamide gel against a clear background. The gel is taken to another tube containing 7% acetic acid as a permanent record. A picture of the gel may also serve as a record. The tube can be scanned for the electrophoretic pattern of these proteins and the scanning kept as a permanent record.

Other limitations of the aforementioned previous method are as follows:

(1) Limited separation due to limited migration in a three-inch tube.—It is impractical to have longer tubes because gel removal will be extremely difficult if not impossible. Also, the separated components in this limited space are not far apart and the discs have a tendency to fuse together.

(2) Nonspecific detection.—There is no specific way of detecting various components. The Amido Schwartz or any other stain usually stains all kinds of proteins and will not distinguish between the various fractions, albumin, $alpha_1$, $alpha_2$, beta and gamma globulins and other fractions of serum proteins. Specific detection methods, as immunopreciptation, cannot be done in this system.

(3) Not suited for enzymes.—The method of polyacrylamide gel electrophoresis can separate enzymes very effectively, but cannot detect them after this separation.

With the foregoing in mind, the present invention seeks to improve electrophoretic methods of this type in such a way that substantially longer tubes may be used for the packing gel and sample while eliminating the necessity for removing the gel and fractionated sample from the tube. As a result, the overall process is much faster and simpler and provides better detection of bands within the cell. Also, staining of the sample is easily accomplished while in the tube, identification of specific components in the mixture may be utilized by introducing detecting components into the tube, sharpness of separated proteins may be improved, fusion between adjacent bands is minimized, and enzymes may be detected.

These and other purposes of the present invention will become more apparent in the course of the ensuing specification and claims, when taken with the accompanying drawings, in which:

FIG. 1 is a diagrammatic view of a typical electrophoresis apparatus with which the invention is used;

FIG. 2 is a sectional view of a sample carrying tube utilized in the apparatus of FIG. 1;

FIG. 3 is a diagrammatic view in section, illustrating centering devices which may be utilized in FIG. 2;

FIG. 4 is a diagrammatic view illustrating sequential method steps of analysis utilized with the apparatus of FIGS. 1–3;

Like elements are designated by like characters throughout the specification and drawings.

Figure 5:
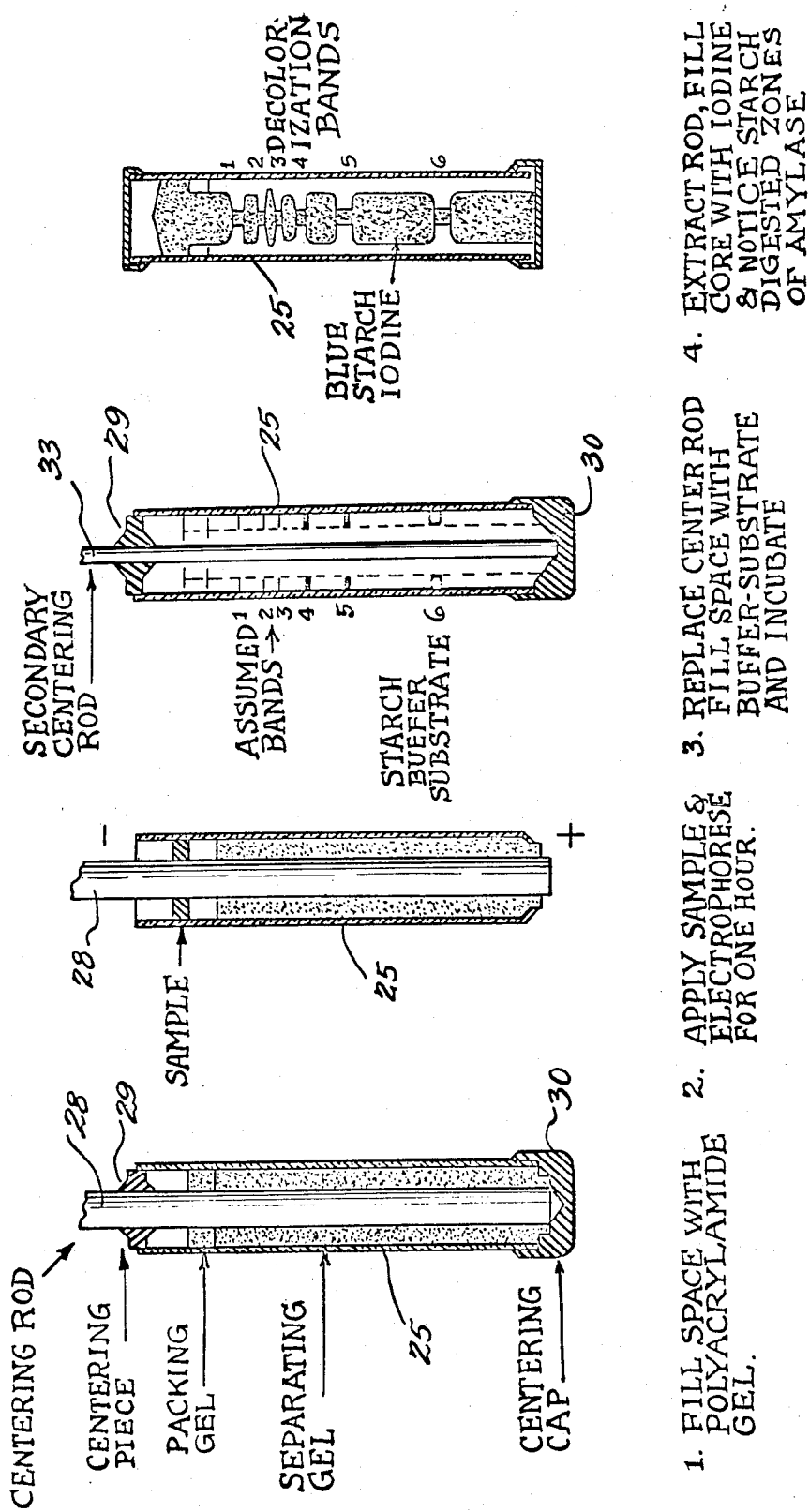
FIG. 5 is another diagrammatic view illustrating sequential method steps of another method of analysis utilizing the apparatus of FIGS. 1–3.

With specific reference now to the drawings and in the first instance to FIG. 1, the numeral 20 designates an electrophoretic cell which may be formed as a two-piece glass cylinder or other equivalent material. The bottom part of the cell is closed by a bottom wall 21 of suitable insulating material. A positive electrode, or anode, 22 projects upwardly from the bottom wall 21 a slight distance and is connected to a suitable source of electric current. The base 23 of the upper part of the cell has a negative electrode, or cathode, 24 projecting a slight distance into the space above the base which serves as a partition. The cathode 24 is also connected to the source of electricity. Base 23 serves as a support for one or more transparent tubes 25 of glass or equivalent material which extend through the base. A buffer solution such as sodium barbital glycine is in the lower part of the cell as at 26 and a similar solution is in the cell above base 23 as at 27. The sample carrying tube 25 projects downwardly into the buffer solution 26 and upwardly into the buffer solution 27. In this general type of apparatus, tube 25 carries a gel such as polyacrylamide. The sample is introduced into the top of the tube 25. An electric source of about 100 volts 5 milliamperes is applied to the anode and cathode for a preselected period of time. During this time particles within the sample become dispersed through the gel due to differences in electrical mobility.

In accordance with the present invention, the tube 25 which carries the gel and sample is provided with a core piece 28 which is centered within the tube. The core piece 28 may be a solid rod of plastic or plexiglass extending throughout the length of the tube 25 and extending outwardly therefrom as illustrated in FIG. 2. Suitable packing 29 is applied to the top of the tube to hold the rod 28 in a centered position. A bottom cap 30 spans the bottom end of the tube.

By use of the central core defined by the rod 28 the separating gel is positioned around this central core. The sample is then introduced into the top of the tube 25, through aperture 29a, as is the case with the known method.

With the present invention, however, following electrophoresis, core 28 may be removed which leaves an opening equivalent to the shape of the core within the separating gel and sample dispersed therethrough. This opening may then be used for the introduction of stains or other substances for the purposes of detection and identification of particular particles.

The core 28 may be held in a centered position in the tube 25 through specially formed bottom caps and top pieces as illustrated in FIG. 3. In FIG. 3, for example, the top centering piece 29 has a recess 31 of upwardly conical form, thereby enabling centering of rods of varying diameters as indicated in dotted outline. The bottom cap 30 in FIG. 3 has an upwardly facing recess of stepped configuration formed as gradually reduced varying diameters from the top of the cap to the bottom thereof so as to enable accommodation of varying sizes of rods as indicated by the dotted lines in FIG. 3. The bottom cap may have a conical recess as is illustrated in FIG. 1 for the same centering purpose and for the purpose of accommodating varying diameters of rods. Similarly, the top centering piece 29 may have a stepped recess of varying diameters as illustrated.

FIG. 4 illustrates a specific use of the apparatus and method described with respect to FIGS. 1–3. In FIG. 4, the tube 25, as shown in FIG. 2, is filled with polyacrylamide gel or equivalent gel around the core 28 in the first step. The second step is to introduce the sample at the top of the tube following solidification of the packing gel. After the gel has solidified and the sample introduced, the bottom cap 30 may be removed. The sample may be any biological fluid such as blood serum, urine, etc. The core rod 28 is then held in its center position by solidification of the gel. The tube is then electrophoresed in the apparatus illustrated in FIG. 1 for about one hour.

Following electrophoresis, the tube 25 is removed from the apparatus and the tube is then positioned in a beaker with an antiserum agar mix. Core rod 28 is removed and a propipette may be utilized to fill the core space within the gel with an antiserum agar mix. The antiserum agar mix is utilized as an indicator for particular substances separated throughout the gel. The antiserum is a substance which will cause precipitation of a specific antigen and will vary with the antigen sought. The tube as illustrated in step 4 is then allowed to incubate, by allowing it to stand at room temperature. The top and bottom of the tube 25 are capped before incubation.

Precipitin bands appear in the core in one to five hours following the start of incubation, as illustrated in step 4, and can be scanned photometrically.

From the foregoing it will be seen that the gel and sample need never be removed from the tube 25. For this reason the tube may be considerably longer than possible with previous apparatus. This greater length enables dispersion of particles throughout a greater length. The precipitin bands, therefore, may be much more distinct and more widely separated than that possible in previous apparatus.

Furthermore, the core may be used for direct staining following step 2 in FIG. 4 in lieu of steps 3 and 4. The core may be filled with stain, the core then flushed with acetic acid to destain the nonprotein fractions. Destaining can be done electrophoretically by filling the core with plain agar followed by electrophoresis.

FIG. 5 illustrates another method of analysis utilizing the apparatus and basic method described with respect to FIGS. 1–3. In FIG. 5 the tube 25 and core rod are assembled as previously described and filled with a polyacrylamide gel as previously described. The second step is to allow the gel to solidify after which time the top piece and bottom cap are removed. The enzyme sample is then introduced above the packing gel. The assembly is then subjected to electrophoresis for about one hour as previously described.

Following electrophoresis, the third step is to remove the center core rod 28 and insert a replacement rod of smaller diameter through use of the bottom cap 30 and the top piece 29. This leaves a vacant space around the core rod 33. This space is filled with a buffer-substrate. For example, if the sample introduced is amylase enzyme, the buffer-substrate can then be starch phosphate. The assembly with the secondary core rod 33 is then allowed to incubate. After about four hours of incubation, the secondary core rod 33 is removed and the space occupied by the secondary core rod is then filled with iodine. This will provide identifiable starch digested zones of amylase activity for identification of enzymes.

The separated fractions of the enzyme act selectively on the buffer-substrate during incubation. The separate fractions of the enzyme diffuse centrally to the core and digest the substrate. After the secondary core rod is extracted, a stain may be introduced into the core to stain the product of the enzyme activity or to stain the undigested substrate. The activity of the separated enzymes will be seen as discs of colorization or discs of decolorization, depending upon which stain is used. Stains for the purposes described are known to the art.

The method and apparatus herein described may be utilized for separation of agglutination factors. The separation of agglutinins is achieved by gel electrophoresis. Then the core is filled with red blood cells suspended in isotonic sucrose solution and the tube is laid flat during incubation. At the position of separated agglutinin factors the red cells settle to the lower periphery of the core while the upper periphery appears as a clear solution.

The invention may also be utilized for hemolysin separation-detection by hemolysis. At the end of the electrophoresis the core is filled with agar mixed with red blood cells. The separated hemolysins will converge to the core and hemolyze the red blood cells to produce transparent discs in a red background.

The invention may also be utilized to identify and detect specific proteins by using monospecific and polyvalent antisera in the agar mixture described with respect to FIG. 4. Upon separation of plasma proteins the albumin alone can be detected by using monospecific antiserum against albumin in the agar mixture in the core. The precipitin bands appearing in the core will then be alubumin precipitated bands only. Other proteins such as orosomucoid, haptoglobin, alpha$_1$, alpha$_2$, beta$_1$, beta$_2$, and gamma globulin, etc., may be similarly identified.

Figure 6:
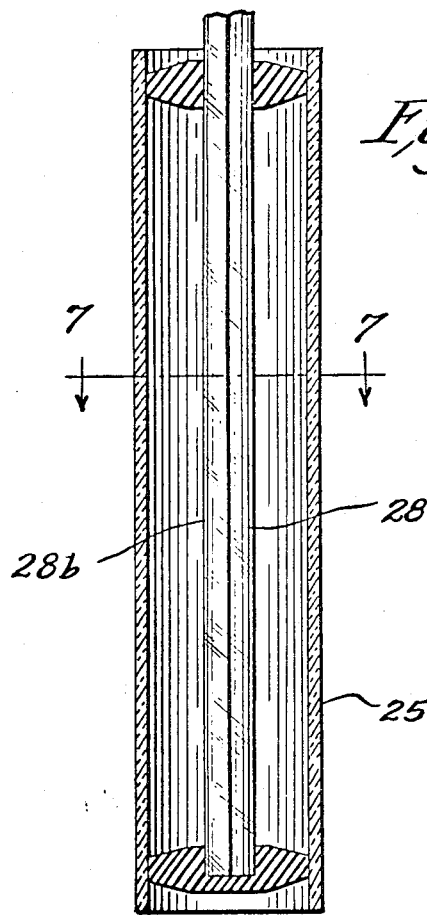
FIG. 6 is a diagrammatic view of apparatus similar to that in FIGS. 1–3 but illustrating a different core structure than that illustrated in FIGS. 1–3.
Figure 8:
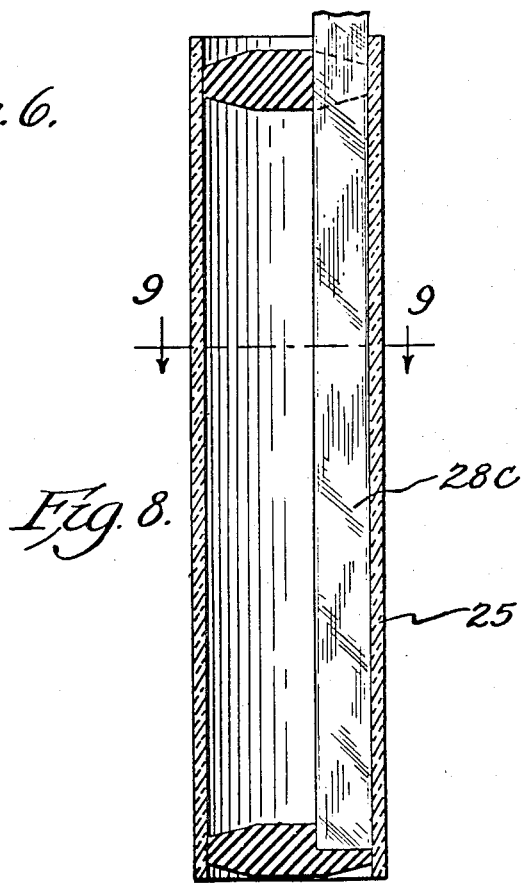
FIG. 8 is a side sectional view of another embodiment of the invention.
Figure 7:
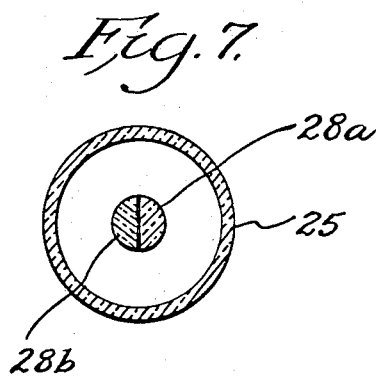
FIG. 7 is a sectional view of FIG. 6 taken on the section lines 7—7 of FIG. 6.
Figure 9:
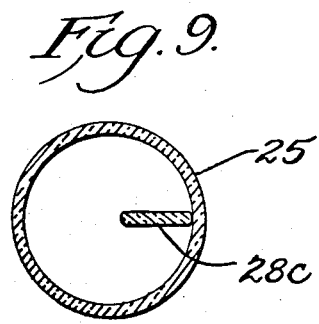
FIG. 9 is a sectional view of the embodiment of FIG. 8 taken on the section lines 9—9 of FIG. 8.

The principles of the invention may also be utilized with plural core rods. For example, in FIG. 6 two cores 28a and 28b are defined by the split halves of a plexiglass rod or rod of equivalent material. After the electrophoresis step, described in step No. 2 in FIG. 4, one of the core halves may be extracted and filled with a polyvalent antiserum core mix to detect all of the charged components of the original mixture. After solidification of the polyvalent antiserum agar mix, the other half of the core may be extracted and the space filled with a monospecific antisera agar mixture which detects a specific type of protein. For example, in detecting albumin, the albumin will appear in both halves of the core. The monospecific antisera mix will indicate and coincide with the opposite polyvalent mix, thus pointing out the albumin fraction in the total sample. The two halves of the core enable use of other different identifying substance in the two halves of the core. The method and apparatus can be easily used to identify specific proteins or antigens by using a mixture of antiserum and gel as the packing and separating gel. In that event the gel and sample can be stained or otherwise identified following electrophoresis FIGS. 8 and 9 illustrate a further modification which is designed to avoid splitting of heavy precipitin discs and the misleading indication of more than one component from the splitting of the same component. In FIGS. 8 and 9 a core rod is defined by an elongated piece of plexiglass or equivalent material 28c. The cross-sectional width is slightly less than the radiuc of the tube 25· This is placed in the tube next to a side portion of the inner wall of the tube as shown and the packing gel then introduced. This type of core will minimize splitting of bands because the splitting will normally occur along the axis of the tube but in opposite directions. In FIGS. 8 and 9 splitting may occur near the center of the tube but not adjacent to the inner wall of the tube.

In FIGS. 8 and 9, the sample is introduced to the tube and then processed in the manner aforementioned.

Plural core pieces may be used within the tube as disclosed in FIGS. 8 and 9 by positioning plural core rods 28c in spaced relation and with both having one portion adjacent the inner side wall of the tube. Also, the system of FIGS. 8 and 9 may be utilized in a method as described with respect to FIG. 5 wherein secondary core rods are introduced into the cores left vacant by the original core rods. Gels other than polyacrylamide may be used.

The principles of the invention are also applicable to electrofocusing methods wherein the gel contains ampholite.

Figure 10:
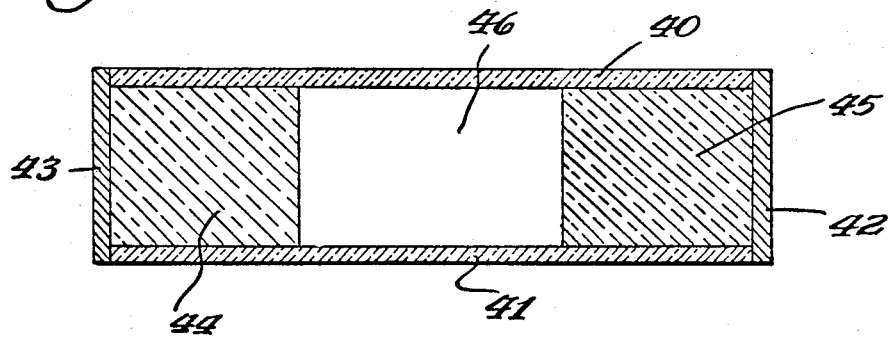
FIG. 10 is a top sectional view of a modification of the invention.
Figure 11:
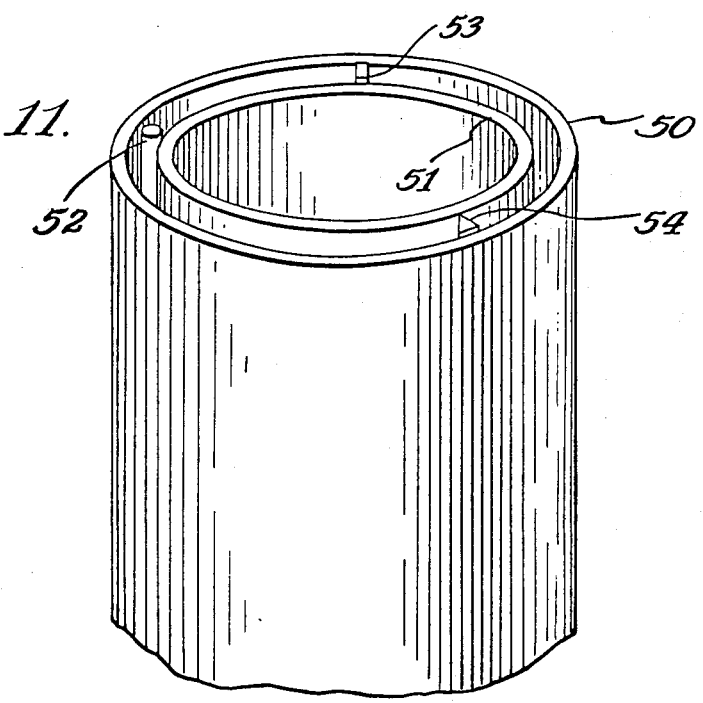
FIG. 11 is a perspective view of another modification of the invention.

Tube 25 can be of circular cross-section or any other cross-section. The important thing is that it provide a transparent enclosure for the polyacrylamide gel and the sample and with a core rod or rods or the equivalent to provide a space within the enclosure and adjacent the gel for the introduction of identifying materials used in the manner described. FIGS. 10 and 11 illustrate such variations within the purview of the invention. In FIG. 10, for example, an enclosure is defined by a pair of spaced and generally parallel transparent plates of glass or equivalent material as at 40 and 41. Suitable end members 42 and 43 complete the enclosure. In FIG. 10 the core is defined by plural blocks 44 and 45 which are spaced from one another to define a central space 46 for the reception of polyacrylamide gel and the sample. In FIG. 10 the core space is thus defined on opposite sides of the gel and sample instead of being within the gel and sample as in the preceding figures. In FIG. 10 the space occupied by the gel and sample may be occupied by a core block and the gel and sample then introduced on opposite sides thereof in the spaces shown as occupied by the core blocks 44 and 45.

The core blocks 44 and 45 may be formed of glass, plexiglass or equivalent inert material.

After the sample has been introduced, and the enclosure and mixture subject to electrophoresis in the manner previously mentioned, the core defining elements 44 and 45 may be removed for the introduction of identifying substances in the manner previously described.

FIG. 11 illustrates a further variation of enclosure and core defining elements. In FIG. 11 an enclosure is defined by a pair of concentric, elongated, cylindrical glass tubes 50 and 51. Core defining elongated members of diverse shapes are illustrated at 52, 53 and 54. Member 52 may have a circular cross-section; member 53 may have a rectangular cross-section; and member 54 may have a triangular cross-section.

In FIG. 11, the gel and sample are introduced into the space between the cylinders 50 and 51 while one or more core members form spaces for the introduction of identifying substances in the manner previously described.

The advantages of gels and samples of long length and wide particle separation distances may be achieved through use of an enclosure with a removable side portion, although in this event not as much versatility of detection can be achieved as is possible with the use of cores within an enclosure. For example, an enclosure may be defined by a pair of spaced and generally parallel plates with suitable side pieces. One of the plates may be slidably while sealingly engaged with the side pieces, whereby the gel and sample may be introduced into the space between the two plates and, following electrophoresis of the sample and gel, the slidable plate may be moved to expose a large surface area of the gel and sample for identification through direct staining or other identification method.

I claim:

1. Apparatus for use in electrophoresis and electrofocusing including a hollow transparent elongated enclosure and an elongated core member of smaller cross-section than the cross-section of the enclosure within the enclosure, a bottom closure cap for one end of said enclosure, stopper means for closing the other end of said enclosure, said stopper means removably holding said member in a selected position within said enclosure, and a separating gel in said enclosure and between said core member and enclosure.

2. The structure of claim 1 wherein said enclosure is a tube and said member is a rod.

3. The structure of claim 2 wherein said stopper means include means for holding said rod coaxially with said tube.

4. The structure of claim 2 wherein said rod is positioned in off-center relation to said tube and positioned adjacent one side wall portion of said tube.

5. The structure of claim 1 characterized by and including plural core members as described, positioned adjacent one another.

6. The structure of claim 1 wherein said enclosure has a rectangular cross-section.

7. The structure of claim 1 wherein said enclosure has an annular cross-section.

References Cited
UNITED STATES PATENTS

| | | | |
|---|---|---|---|
| 3,346,479 | 10/1967 | Natelson | 204—299 X |
| 3,453,200 | 7/1969 | Allington | 204—299 X |
| 3,539,493 | 11/1970 | Dorman | 204—299 |

JOHN H. MACK, Primary Examiner

A. C. PRESCOTT, Assistant Examiner

U.S. Cl. X.R.

204—180 G

Notice of Adverse Decision in Interference

In Interference No. 99,411, involving Patent No. 3,799,863, R. A. Zeineh, ELECTROPHORESIS AND ELECTROFOCUSING APPARATUS, final judgment adverse to the patentee was rendered Mar. 17, 1978, as to claims 1, 2, 3 and 7.

[*Official Gazette August 8, 1978.*]